US012594749B2

(12) United States Patent  
Coolich et al.

(10) Patent No.: US 12,594,749 B2  
(45) Date of Patent: Apr. 7, 2026

(54) RECYCLABLE BAG

(71) Applicant: AMCOR FLEXIBLES NORTH AMERICA, INC., Neenah, WI (US)

(72) Inventors: Melissa Kanzelberger Coolich, Hortonville, WI (US); Kylie C. Hartford, Appleton, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 210 days.

(21) Appl. No.: 18/567,696

(22) PCT Filed: Jun. 30, 2021

(86) PCT No.: PCT/US2021/039828  
§ 371 (c)(1),  
(2) Date: Dec. 6, 2023

(87) PCT Pub. No.: WO2023/277901  
PCT Pub. Date: Jan. 5, 2023

(65) Prior Publication Data  
US 2024/0269972 A1 Aug. 15, 2024

(51) Int. Cl.  
| *B32B 27/08* | (2006.01) |
| *B32B 7/12* | (2006.01) |
| *B32B 27/32* | (2006.01) |
| *B65D 33/01* | (2006.01) |
| *B65D 33/25* | (2006.01) |
(Continued)

(52) U.S. Cl.  
CPC ............... *B32B 27/08* (2013.01); *B32B 7/12* (2013.01); *B32B 27/32* (2013.01); *B65D 33/01* (2013.01);  
(Continued)

(58) Field of Classification Search  
CPC ........... B32B 27/08; B32B 27/32; B32B 3/08; B32B 2250/24; B32B 2255/10; B32B 2307/7376; B65D 33/01; B65D 33/25; B65D 65/38; B65D 75/26; B65D 75/28; B65D 75/58; B65D 75/5805; B65D 31/02;  
(Continued)

(56) References Cited

U.S. PATENT DOCUMENTS

| 4,147,291 A | 4/1979 | Akao et al. |
| 5,788,121 A * | 8/1998 | Sasaki .................. B65D 77/065 383/120 |

(Continued)

FOREIGN PATENT DOCUMENTS

| DE | 102019124821 A1 | 3/2021 |
| EP | 2987744 A1 | 2/2016 |
(Continued)

OTHER PUBLICATIONS

PCT International Search Report, International Application No. PCT/US2021/0396828, issued Oct. 6, 2021, 3 pages.

*Primary Examiner* — Bryon P Gehman

(57) ABSTRACT

A quad-seal package has a front panel, back panel, first side panel, and second side panel formed from a recyclable packaging film. The recyclable packaging film includes a machine-direction oriented, polyethylene-rich exterior film and a polyethylene-based interior film. The quad-seal package, when containing a granular product, resists rupture when dropped according to ASTM D5276-98 test procedure A2.2.1 on the bottom of the package at a drop height of 91.4 cm (36 inches).

19 Claims, 9 Drawing Sheets

(51) Int. Cl.

| | | |
|---|---|---|
| *B65D 65/38* | (2006.01) | |
| *B65D 75/26* | (2006.01) | |
| *B65D 75/28* | (2006.01) | |
| *B65D 75/58* | (2006.01) | |

(52) U.S. Cl.
CPC ............. *B65D 33/25* (2013.01); *B65D 65/38* (2013.01); *B65D 75/26* (2013.01); *B65D 75/28* (2013.01); *B65D 75/5805* (2013.01); *B32B 2250/242* (2013.01); *B32B 2255/10* (2013.01); *B32B 2255/26* (2013.01); *B32B 2307/31* (2013.01); *B32B 2307/408* (2013.01); *B32B 2307/516* (2013.01); *B32B 2307/558* (2013.01); *B32B 2307/5825* (2013.01); *B32B 2307/7376* (2023.05); *B32B 2439/46* (2013.01); *B32B 2439/70* (2013.01); *B65D 2203/00* (2013.01); *B65D 2205/00* (2013.01); *B65D 2565/386* (2013.01)

(58) Field of Classification Search
CPC .............. B65D 33/2533; B65D 75/008; B65D 2203/00; B65D 2205/00; B65D 2565/38
USPC .................. 206/521; 383/104, 107, 109–120
See application file for complete search history.

(56) References Cited

U.S. PATENT DOCUMENTS

| | | | | |
|---|---|---|---|---|
| 6,213,645 B1* | 4/2001 | Beer | ....................... | B65D 75/46 |
| | | | | 383/203 |
| 7,866,885 B2* | 1/2011 | Kujat | .................. | B65D 33/105 |
| | | | | 383/17 |
| 8,240,915 B2* | 8/2012 | Sargin | .................... | B65D 33/22 |
| | | | | 383/117 |
| 8,475,046 B2* | 7/2013 | Jansen | ................... | B65D 33/18 |
| | | | | 383/88 |
| 8,741,405 B2 | 6/2014 | Perick | | |
| 8,979,368 B2* | 3/2015 | Sargin | .................... | B65D 33/22 |
| | | | | 383/117 |
| 9,056,697 B2* | 6/2015 | Smith | ..................... | B32B 27/32 |
| 9,676,172 B2 | 6/2017 | Rosa et al. | | |
| 9,908,668 B2* | 3/2018 | Wilkes | .................. | B65D 33/06 |
| 11,214,406 B2* | 1/2022 | Kluenenberg | ..... | B65D 33/2508 |
| 11,518,149 B2* | 12/2022 | Liu | ........................ | B32B 27/20 |
| 2006/0104550 A1 | 5/2006 | Kuge et al. | | |
| 2010/0016825 A1* | 1/2010 | Graf | .................... | B65D 75/008 |
| | | | | 383/107 |
| 2010/0150479 A1 | 6/2010 | Smith | | |
| 2011/0150368 A1 | 6/2011 | Ellsworth et al. | | |
| 2013/0004627 A1 | 1/2013 | Kerr et al. | | |
| 2014/0151260 A1 | 6/2014 | Frank et al. | | |
| 2015/0274392 A1* | 10/2015 | Pease | .................... | B65D 75/48 |
| | | | | 383/120 |
| 2017/0121082 A1 | 5/2017 | Tiwari et al. | | |
| 2018/0099492 A1 | 4/2018 | Yun et al. | | |
| 2020/0189248 A1 | 6/2020 | Koesters et al. | | |

FOREIGN PATENT DOCUMENTS

| | | |
|---|---|---|
| WO | 2009016572 A1 | 2/2009 |
| WO | 2016135213 A1 | 9/2016 |
| WO | 2022191833 A1 | 9/2022 |

* cited by examiner

100

1500

RECYCLABLE BAG

TECHNICAL FIELD

This disclosure is related to bags of a quad-seal format and recyclable film structures used to produce the bags. The sealed bags provide product protection and superior durability.

BACKGROUND

Pre-made quad-seal bags (e.g., quattro bag/pouch, four corner block bottom bag/pouch, four sided seal bag/pouch, four weld bag/pouch, or single lip bag/pouch) include two side gusset panels and two face panels that are joined by four vertical seals where the expandable side gussets allow for more volume and the bag to hold a square or rectangular shape on shelf. The bags may be available with a flat bottom to stand upright on a shelf. Other bags may include a bottom that is closed by a seal or a fold under flap such that the bags may lay on a shelf and in some cases stand upright. The bags are free of a back seal that results in large, uninterrupted panel areas for product information and marketing graphics and are typically used in pet food and dry goods (sugar, protein powder etc.), and consumer goods. To achieve recyclability while maintaining rigorous performance requirements required by the industry, bags are made using highly engineered flexible structures. The flexible structures typically have a multitude of films, layers, and materials to achieve the necessary characteristics for making, filling, and distributing the bags. The bags often include many convenience features such as a reclose system and a handle. A variety of food or other consumer goods may be packaged in the quad-seal bags.

The quad-seal bag allows for high filling volume of flowable product. However, the format of the bag also requires a demanding bag making process, due to the many triple-points in the seals where three or more bag panels meet. High temperatures are required to drive enough heat into the sealing layer to achieve good caulking in the triple-point. As a result, high temperature resistant polymers are typically used on the exterior surface of the flexible structure, such as oriented polyester or oriented polyamide. This mix of polymeric materials leads to a flexible structure and a bag that cannot be recycled in a single-polymer recycling stream.

SUMMARY

Disclosed herein are quad-seal bags constructed from a recyclable packaging film. The packaging film is designed such that the unfilled bags can be produced on standard bag making equipment and the bags can be filled and sealed on standard filling equipment. When filled with dry product, the sealed bags have excellent drop strength and product protection.

In an embodiment, a packaged product includes a granular product and a bag. The bag includes a front panel, a back panel, a first side panel, a second side panel, a top seal, a first side seal, a second side seal and a bottom seal. The first side seal includes a front leg portion bonding the front panel to the first side panel, and a back leg portion bonding the back panel to the first side panel. The second side seal includes a front leg portion bonding the front panel to the second side panel, and a back leg portion bonding the back panel to the second side panel. Each of the front panel, the back panel, the first side panel, and the second side panel includes a recyclable packaging film that includes a polyethylene-rich, oriented exterior film, a polyethylene-based interior film and an adhesive layer connecting the exterior film to the interior film. The interior film includes a sealing surface that includes a first outer layer of the interior film that can be exposed to the granular product. The interior film includes a laminating surface that includes a second outer layer of the interior film that is exposed to the adhesive layer. The bag contains the granular product. The bag includes a top and a bottom. The packaged product resists rupture when dropped according to ASTM D5276-98 test procedure A2.2.1 on the bottom of the bag at a drop height of 91.44 cm (36 inches).

Other features that may be used individually or in combination with respect to the embodiment are as follows.

The laminating surface of the interior film may include a polyethylene comprising a melting temperature greater than 115.5° C. (240° F.).

The first side seal may further include a top portion bonding the front panel to the back panel and the second side seal further including a top portion bonding the front panel to the back panel.

The bag may further include a bottom panel constructed of a recyclable packaging film. The bottom seal may include a front portion bonding the front panel to the bottom panel, a back portion bonding the back panel to the bottom panel, a first side portion bonding the first side panel to the bottom panel, and a second side portion bonding the second side panel to the bottom panel.

The bottom seal bonds the front panel to the back panel.

At least one of the front panel, the back panel, the first side panel and the second side panel of the bag may include a ventilation feature.

The bag may include a zipper closure.

The granular product comprises a weight from 1.36 kg to 22.68 kg (3 pounds to 50 pounds).

The bag may include an interior film thickness from 104 microns to 145 microns (4.1 mil to 5.7 mil).

The exterior film may be machine-direction oriented and includes at least 95% polyethylene-based materials.

The exterior film may be machine-direction oriented and consists of one or more polyethylene-based polymers.

The sealing surface of the interior film may include a polyethylene comprising a melting temperature that is at least −6.67° C. (20° F.) lower than the laminating layer melting temperature.

The adhesive layer may be a two-component laminating adhesive.

The bag may include a total composition including between 90% and 99% polyethylene-based polymer, by weight.

The bag may include a total composition including at least 95% polyethylene-based polymer, by weight.

The recyclable packaging film may include a machine direction tear value and a cross direction tear value, each including greater than 17,000 mN (26.3 pound-force) according to ASTM D1922-09 as described herein.

The recyclable packaging film may include a print layer that may be positioned between the exterior film and the interior film.

The recyclable packaging film may include a matte varnish on an exterior surface of the exterior film.

The recyclable packaging film may include a seal window comprising from 116° C. to about 149° C.

BRIEF DESCRIPTION OF THE DRAWINGS

The disclosure may be more completely understood in consideration of the following detailed description of various embodiments of the disclosure in connection with the accompanying drawings, in which.

Figure 1:
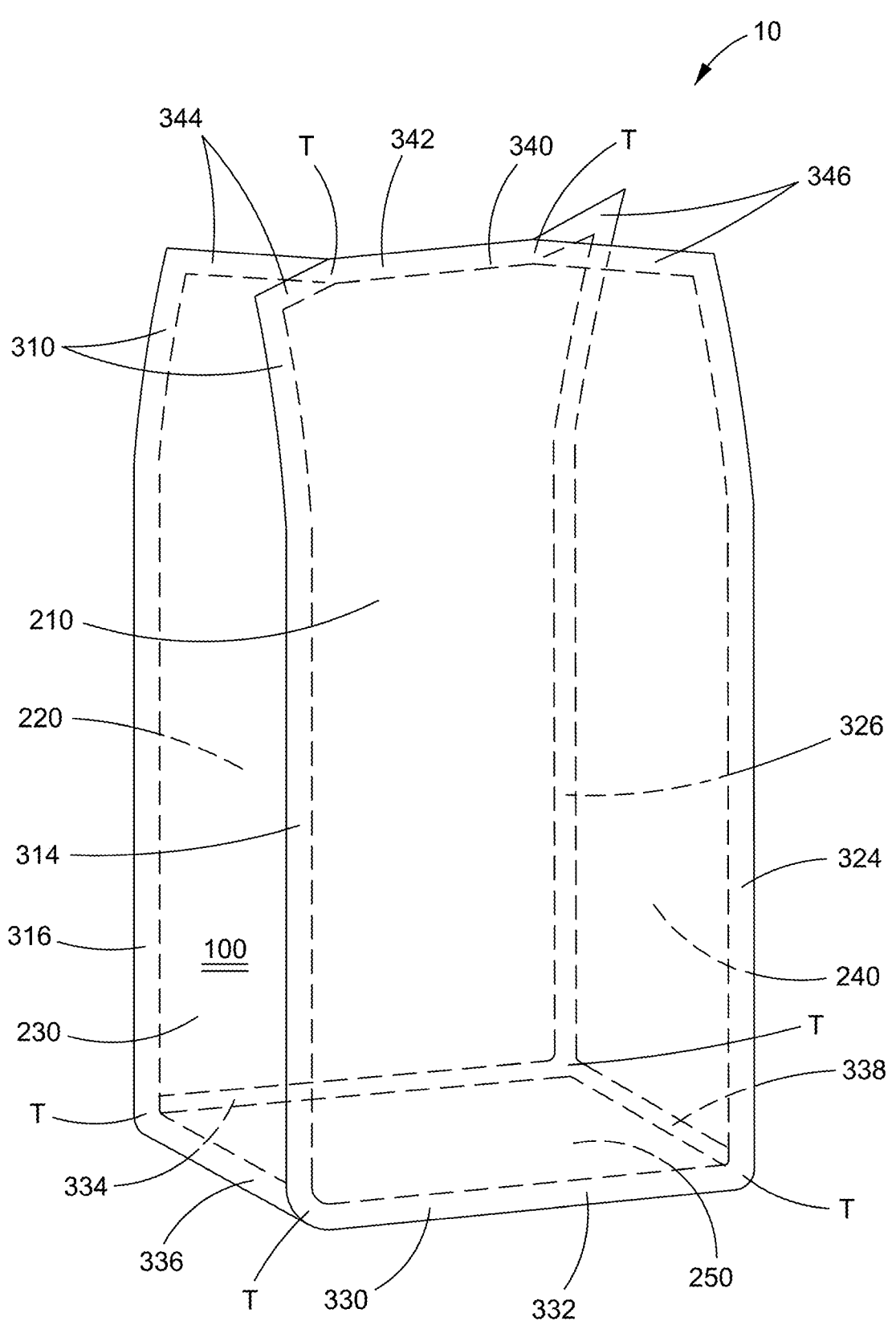
FIG. 1 illustrates a schematic perspective view of an embodiment of a quad-seal bag.

The drawings show some but not all embodiments. The elements depicted in the drawings are illustrative and not necessarily to scale, and the same (or similar) reference numbers denote the same (or similar) features throughout the drawings.

DETAILED DESCRIPTION

Quad-seal bags are used to package dry products that can include volumes of up to or greater than 22.68 kg (50 pounds). The dry products may include powder or granular type products that require secure containment. Non-limiting examples of product include protein powder, powdered or granulated laundry detergent, cat litter (e.g., granulated clay, absorbent granules, absorbent particles, etc.), dry pet food or kibble, bird seed, lawn seed, and lawn fertilizer. The quad-seal bags are manufactured from packaging films that can be sealed to meet the demands of the bag manufacturing process, including speed demands, as well as supply chain demands (e.g., distribution and handling) of the product filled bag such that product does not unintentionally exit the bag from a partially sealed or unsealed portion of a seal area.

In the past, the packaging films contained several different polymeric material types (i.e., combinations of polyester, polyamide and polyolefin) to achieve the critical qualities of the sealed quad-seal bag application. It is desirable to design a packaging film with limited material types, moving as much of the structure as possible to a single polymer type. In this manner, the quad-seal bag made from the packaging film may be considered recyclable.

The focus of the quad-seal bags described herein is to allow consumers to easily recycle the bag in a polyethylene or polyolefin recycling stream, while maintaining the high-performance characteristics including quality seals and excellent toughness and durability.

The quad-seal bags described herein include high levels of polyethylene-based polymers, in excess of 90% or even 95%, by weight. The packaging film used to produce the quad-seal bags include high levels of polyethylene-based polymers, in excess of 90% or even 95%, by weight. Any additional components of the quad-seal bags, such as zippers, may also include high levels of polyethylene-based polymers.

There are many competing characteristics of a packaging film intended to be used for sealed quad-seal bags. First, the film must have good heat resistance such that the film does not become marred or otherwise damaged through the strenuous bag making process. Second, the film must provide heat seals that can caulk triple-point seal areas yet remain strong after the seal is made. Third, the film must have good integrity to survive drops and other abuse after being filled and sealed. The details of these challenges will be further described below. It was unexpectedly and advantageously found that a packaging film, produced from a high percentage of polyethylene-based polymers, designed according to the characteristics described here, was able to achieve a balance between each of these characteristics, and could be used to produce high performance, sealed quad-seal bags. This discovery renders the bags recyclable and suitable for use in packaging high weights of products, as desired.

Quad-Seal Bag

An embodiment of a quad-seal bag 10, as described herein, may have construction features as shown in FIG. 1. The bag has a front panel 210, a back panel 220, a first side panel 230, a second side panel 240 and a bottom panel 250. Each of the panels is constructed from a recyclable packaging film. The panels may be constructed of the same recyclable packaging film (i.e., all panels identical), or the panels may be constructed of a different recyclable packaging film (i.e., the panels are constructed from more than one recyclable packaging film).

The panels of the quad-seal bag 10 are connected by seals. As used herein, seals between the panels are heat seals produced by the application of heat and pressure, as is known in the art. The front panel 210 and the back panel 220 are connected at or near the top of the bag by a top seal 340. The top seal 340 has a first portion 342 connecting the front panel 210 to the back panel 220, a second portion 344 connecting the first side panel 230 to the front panel 210 and to the back panel 220 and a third portion 346 connecting the second side panel 240 to the front panel 210 and to the back panel 220. In this manner, the first side panel 230 has a gusset-like formation, terminating in a triple-point T of the top seal 340 where the first side panel 230, the front panel 210 and the back panel 220 meet. Likewise, the second side panel 240 has a gusset-like formation, terminating in a triple-point T of the top seal 340 where the second side 240, the front panel 210 and the back panel 220 meet. Embodiments that include the first side panel 230 and the second side panel 240 in the top seal 340 are sometimes referred to as quad-seal bags that include non-terminated gussets. The bag 10 shown in FIG. 1 includes non-terminated gussets.

A first side seal 310 and a second side seal 320 extend from the top to the bottom of the bag 10. The first side seal 310 includes a front leg portion 314 connecting the front panel 210 to the first side panel 230 and a back leg portion 316 connecting the back panel 220 to the first side panel 230. The second side seal 320 further includes a front leg portion 324 connecting the front panel 210 to the second side panel 240 and a back leg portion 326 connecting the back panel 220 to the second side panel 240.

To complete the bag, the bottom panel 250 is connected by a bottom seal 330. The bottom seal 330 has a front portion 332 connecting the front panel 210 to the bottom panel 250, a back portion 334 connecting the back panel 220 to the bottom panel 250, a first side portion 336 connecting the first side panel 230 to the bottom panel 250 and a second side portion 338 connecting the second side panel 240 to the bottom panel 250. Each portion of the bottom seal terminates at a triple-point T of the bottom seal (i.e., four triple-points, one at each corner of the bottom panel), where three of the panels meet. Further, the bag includes a top and a bottom. The top of the bag corresponds to a portion of the bag where an end user may open the bag or dispense product from the bag and includes the top seal 340. The bottom of the bag is opposite the top of the bag and corresponds to the portion of the bag that rests on a shelf or surface when the bag is in an upright manner and includes the bottom seal 330 and/or the bottom panel 250.

Figure 2:
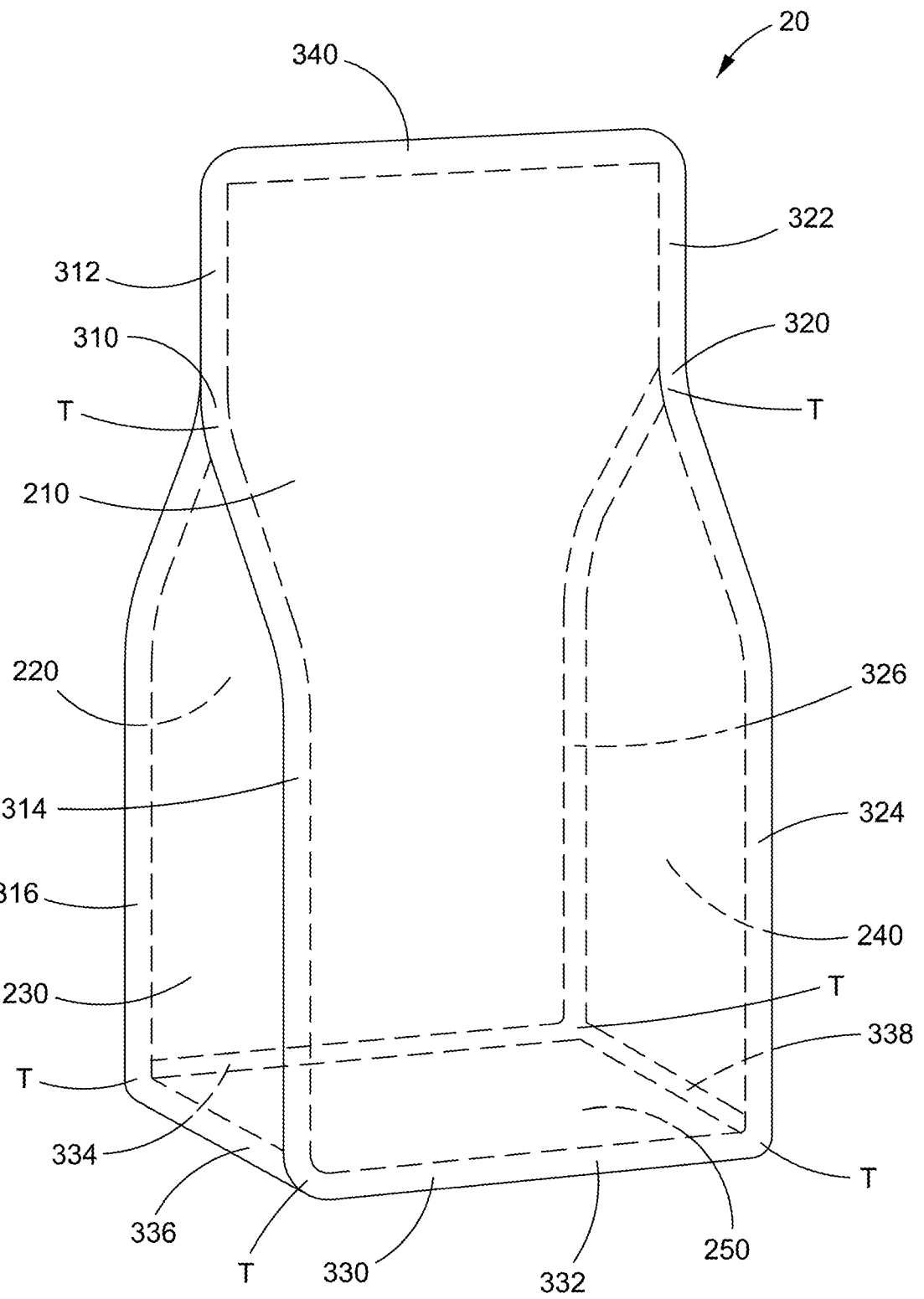
FIG. 2 illustrates a schematic perspective view of an embodiment of a quad-seal bag.

Another embodiment of a quad-seal bag 20, as described herein, may have construction features as shown in FIG. 2. The panels of the quad-seal bag 20 are connected by seals. The front panel 210 and the back panel 220 are connected at or near the top of the bag 20 by the top seal 340. The front panel 210 and the back panel 220 are also connected by a top portion 312 of the first side seal 310 and a top portion 322 of the second side seal 320. The first side seal 310 and second side seal 320 extend from the top to the bottom of the bag 10. The first side seal 310 includes the front leg portion 314 connecting the front panel 210 to the first side panel 230 and the back leg portion 316 connecting the back panel 220 to the first side panel 230. In this manner, the first side panel 230 has a gusset-like formation, terminating in a triple-point T of the first side seal 310 where the first side panel 230, the front panel 210 and the back panel 220 meet. Likewise, the second side seal 320 includes the front leg portion 324 connecting the front panel 210 to the second side panel 240 and the back leg portion 326 connecting the back panel 220 to the second side panel 240. The second side panel 230 has a gusset-like formation, terminating in a triple-point T of the second side seal 320 where the second side panel 240, the front panel 210 and the back panel 220 meet. Embodiments that do not include the first and second side panels in the top seal are sometimes referred to as bags that include terminated gussets. The bag 20 shown in FIG. 2 includes terminated gussets. To complete the pouch, the bottom panel 250 is connected by the bottom seal 330. The bottom seal 330 includes the front portion 332 connecting the front panel 210 to the bottom panel 250, the back portion 334 connecting the back panel 220 to the bottom panel 250, the first side portion 336 connecting the first side panel 230 to the bottom panel 250 and the second side portion 338 connecting the second side panel 240 to the bottom panel 250.

Figures 3, 4:
FIG. 3 illustrates a schematic perspective view of an embodiment of a quad-seal bag.
FIG. 4 illustrates a schematic side view of the embodiment of a quad-seal bag shown in FIG. 3.

Another embodiment of a quad-seal bag 30, as described herein, may have construction features as shown in FIGS. 3 and 4. The bag has a front panel 1210, a back panel 1220, a first side panel 1230, and a second side panel (not shown). Each of the panels is constructed from a recyclable packaging film. The panels may be constructed of the same recyclable packaging film (i.e., all panels identical) or the panels may be constructed of a different recyclable packaging film (i.e., the panels are constructed from more than one recyclable packaging film).

The panels of the quad-seal bag 30 are connected by seals. As used herein, seals between the panels are heat seals produced by the application of heat and pressure, as is known in the art. The front panel 1210 and the back panel 1220 are connected at or near the top of the bag by a top seal

1340. The front panel 1210 and the back panel 1220 are also connected by the top portion 1312 of a first side seal 1310 and a top portion 1322 of a second side seal 1320. The first side seal 1310 and second side seal 1320 extend from the top to the bottom of the bag 30. The first side seal 1310 further includes a front leg portion 1314 connecting the front panel 1210 to the first side panel 1230 and a back leg portion 1316 connecting the back panel 1220 to the first side panel 1230. In this manner, the first side panel 1230 has a gusset-like formation, terminating in a triple-point T of the first side seal 1310 where the first side panel 1230, the front panel 1210 and the back panel 1220 meet. Likewise, the second side seal 1320 further includes a front leg portion (not shown) connecting the front panel 1210 to the second side panel (not shown) and a back leg portion (not shown) connecting the back panel 1220 to the second side panel (not shown). The second side panel has a gusset-like formation, terminating in a triple-point (not shown) of the second side seal 1320 where the second side panel, the front panel 1210 and the back panel 1220 meet. To complete the pouch, the front panel 1210 is connected to the back panel 1220 by a bottom seal (e.g., pinch bottom) 1330. In some embodiments, the bottom seal may be folded towards either the front panel or the back panel, as shown in FIG. 4, and may be adhered to the respective panel that the seal is folded towards.

The quad-seal bags as described herein can be used to package a variety of granular products. The term "granular product", as used herein, refers to dry product that are dry and granular, particulate or powder. The bags can be filled and sealed. A sealed quad-seal bag as described herein should not have leaks in the seals, even at the triple point areas of the heat seals. In other words, the seals of the quad-seal bags can be leak-proof such that air or granular product are not allowed to pass through the seal. The recyclable packaging film has sufficient integrity and the heat seals are formed such that the packaged product is effectively contained and protected from the environment external to the bag.

Figure 5:
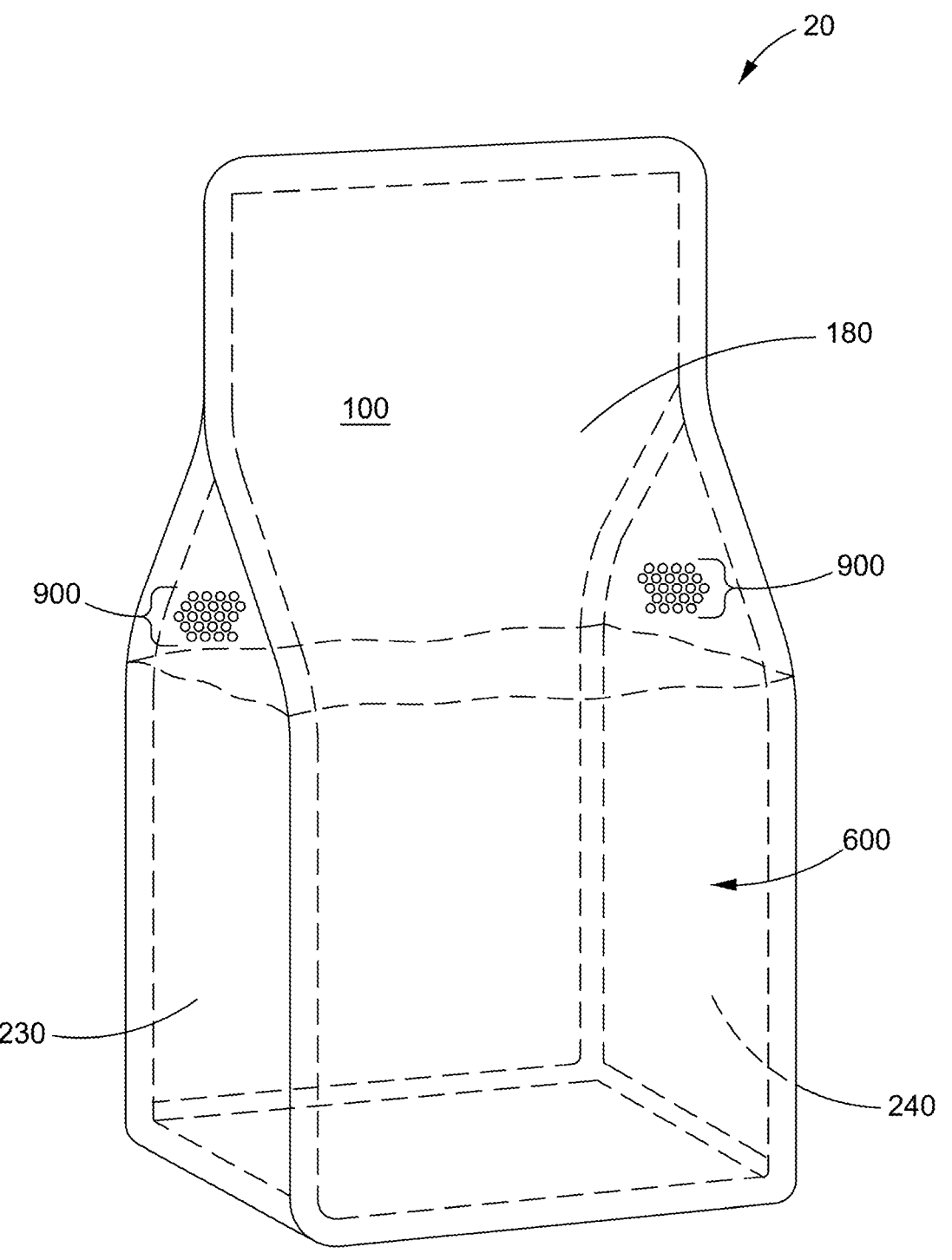
FIG. 5 illustrates a schematic perspective view of an embodiment of a quad-seal bag.

With reference to FIG. 5, the sealed quad-seal bag 20 constructed from panels of a recyclable packaging film 100, contains a product 600 in an interior space 180. Granular products may be dry particulate and examples include pet food kibble, dry milk powder, protein powder, dry drink mix, cocoa, rice or other grains. While dry particulate products are exemplary of product that can be contained in the bags, it should be understood that the product may also be other dry products, (e.g., snacks such as pretzels, potato chips, crackers, etc.), semi-moist or moist products. The bags may have a wide variety of dimensions (i.e., height, width, depth), but are generally capable of standing upright easily when filled with product and often have a height that is greater than the width. The bags may be of sufficient dimension that they can contain a product having a product weight from about 300 grams (gm), (0.66 pounds) to about 22.7 kilograms (kg), (50 pounds).

The quad-seal bags are typically pre-made, meaning that they are produced on a piece of equipment dedicated to bag-making, in a separate process from filling and final sealing the pouch. Bag-making utilizes one or more rolls of recyclable packaging film, mechanically forming and heat sealing the panels. During production of the pre-made bags, additional features may be added, such as zippers and tear notches.

The pre-made quad-seal bags are filled and sealed on filling lines, as is known in the art. The bag is mechanically opened, a measured quantity of product is loaded into the interior space of the bag, and a final seal (top seal 340, 1340) is completed, sealing the product within the quad-seal bag.

Figure 6A:
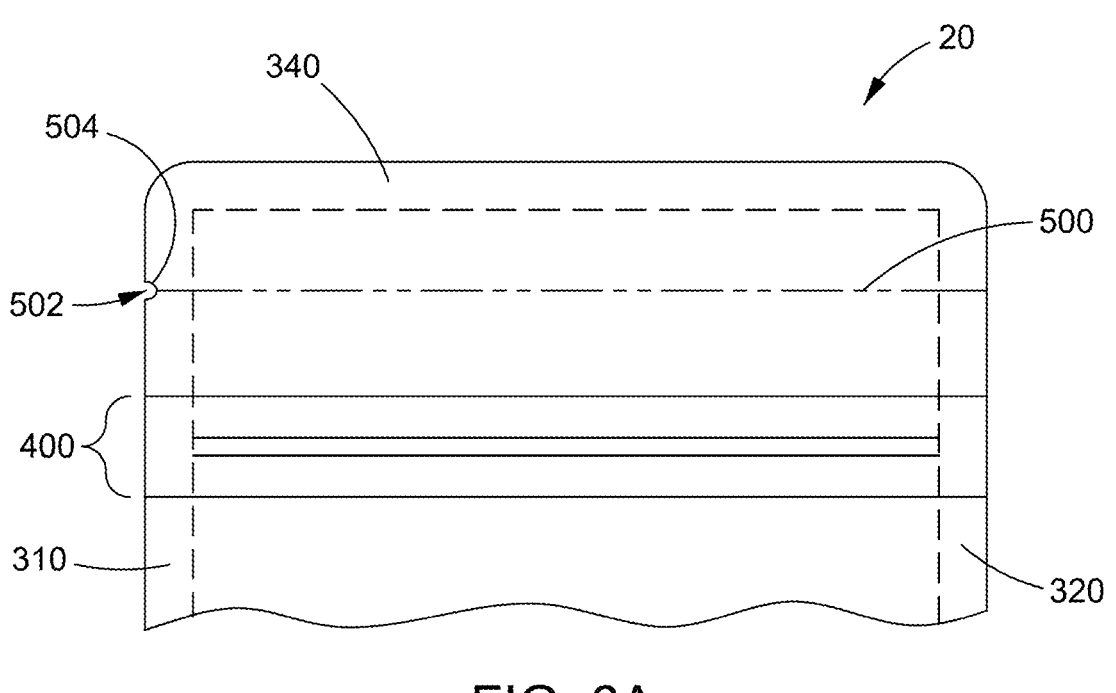
FIG. 6a illustrates a schematic front view of a top portion of an embodiment of a quad-seal bag.
Figure 6B:
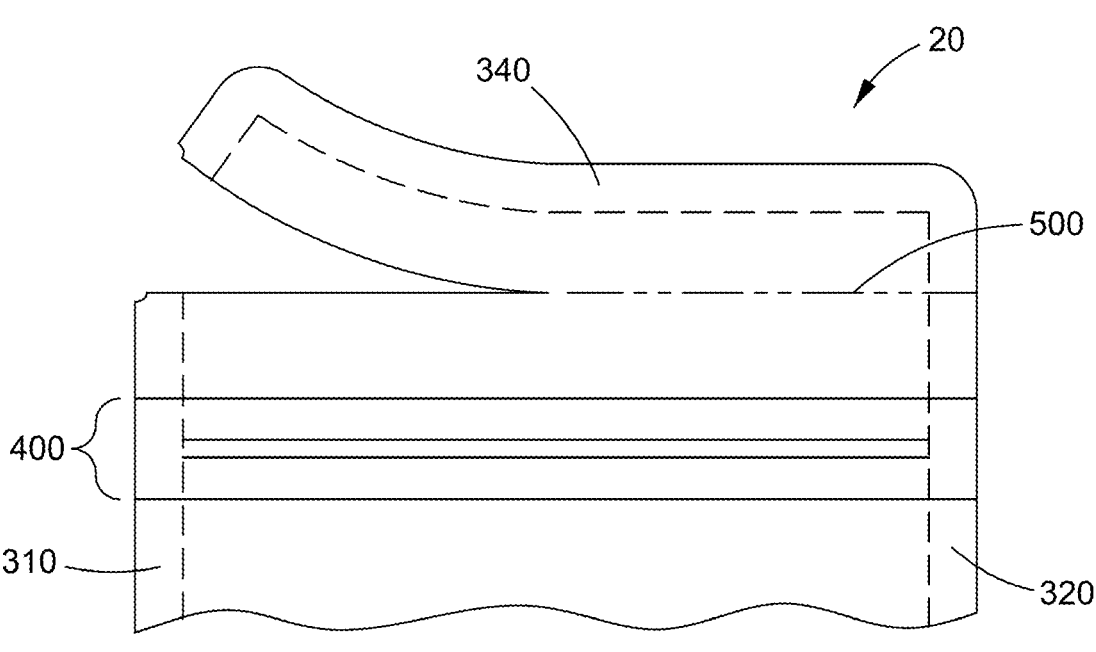
FIG. 6b illustrates a schematic front view of the top portion of the embodiment of the quad-seal bag shown in FIG. 6a that has been partially opened.

The quad-seal bag may be produced with additional features and/or components. These features and/or components, such as tear lines, tear notches and zippers (e.g., single-lip bag, quad-seal flat bottom bag with zipper). These features may facilitate easy opening of the bag and reclosing of the bag after the initial opening. With reference to FIGS. 6a and 6b, schematic views of the top portion of an embodiment of a sealed quad-seal bag 20 is shown. A zipper 400 may be included, spanning from the first side seal 310 to the second side seal 320. Upon bag making, the zipper is included within each of the side seals and is typically attached to both the front and back panels across the entire width of the bag. The zipper 400 can be manually opened and pressed to reseal, as is common in many package styles. Selection of the zipper component should be done such that the composition of the zipper is either 100% or nearly 100% polyethylene-based polymer, such that it does not detract from the recyclability of the bag. Zipper component selection should also ensure that there is no product leakage from the zipper, until the zipper is intentionally opened, or around the area where the zipper is attached to the bag.

The embodiments shown in FIGS. 6a and 6b also depict a line of weakness 500 and a tear notch 502. In various embodiments, lines of weakness and tear notches may be used together or independently. The line of weakness 500 and/or tear notch 502 are present to allow for manual opening of the bag, without the use of a tool, such as a scissors. As shown in FIG. 6b, the top seal 340 of the bag can be torn away from the remainder of the bag at the point of the tear notch 502 or line of weakness 500, allowing for access to the contents of the bag. The bag may alternatively include a tear initiator (e.g., a line of weakness, a slit, etc.) in place of the tear notch.

A line of weakness 500 may be present in either or both of the front panel and the back panel of the quad-seal bag. In some embodiments, the line of weakness is formed mechanically. In other embodiments, the line of weakness is formed by laser scoring (i.e. a laser scored line of weakness). A line of weakness may be either continuous, spanning from one side edge of the pouch to the other side edge of the pouch, or it may be intermittent. In some embodiments, there are multiple lines of weakness in a single panel, running parallel to each other.

A particularly advantageous embodiment of a quad-seal bag includes a laser scored line of weakness in the front panel and a laser scored line of weakness in the back panel. Each of the laser scored lines of weakness span across the front or back panel from the first side seal 310 to the second side seal 320. The lines of weakness are more effective, producing an easier tear.

Figure 7A:
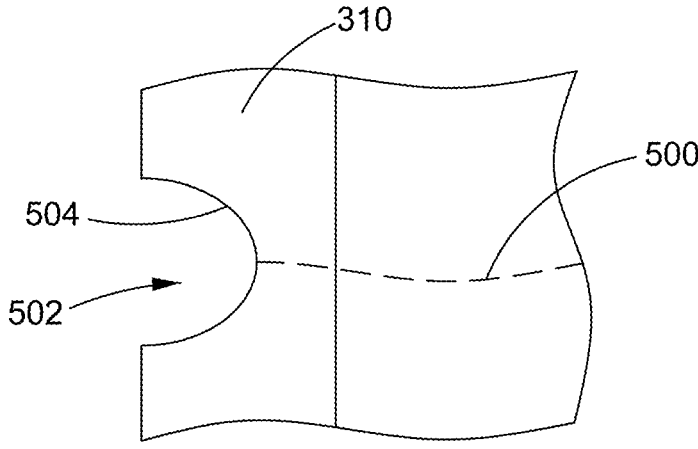
FIG. 7a illustrates a schematic front view of a tear notch detail on an embodiment of a quad-seal bag.
Figure 7B:
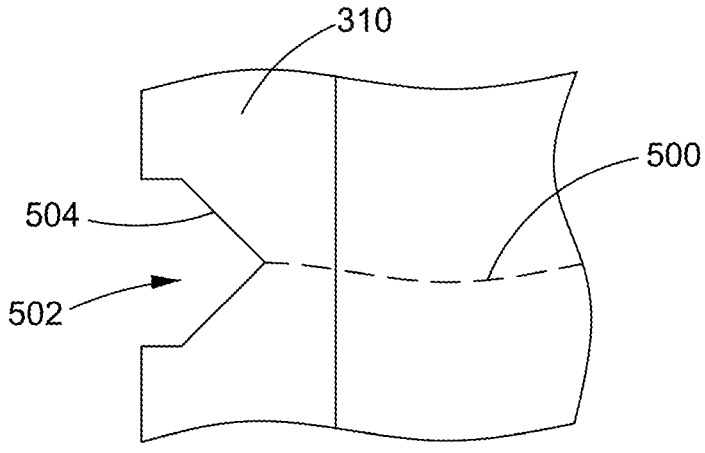
FIG. 7b illustrates a schematic front view of a tear notch detail on the embodiment of the quad-seal bag.

A tear notch 502 may be present in either or both the first side seal 310 and the second side seal 320. The tear notch 502 should be adjacent to the line of weakness 500, if both are present. In some embodiments, the internal shape of the tear notch 504 is rounded, an example of which is shown in FIG. 7a. In some embodiments, the internal shape of the tear notch 504 is non-rounded, an example of which is shown in FIG. 7b.

Figure 8A:
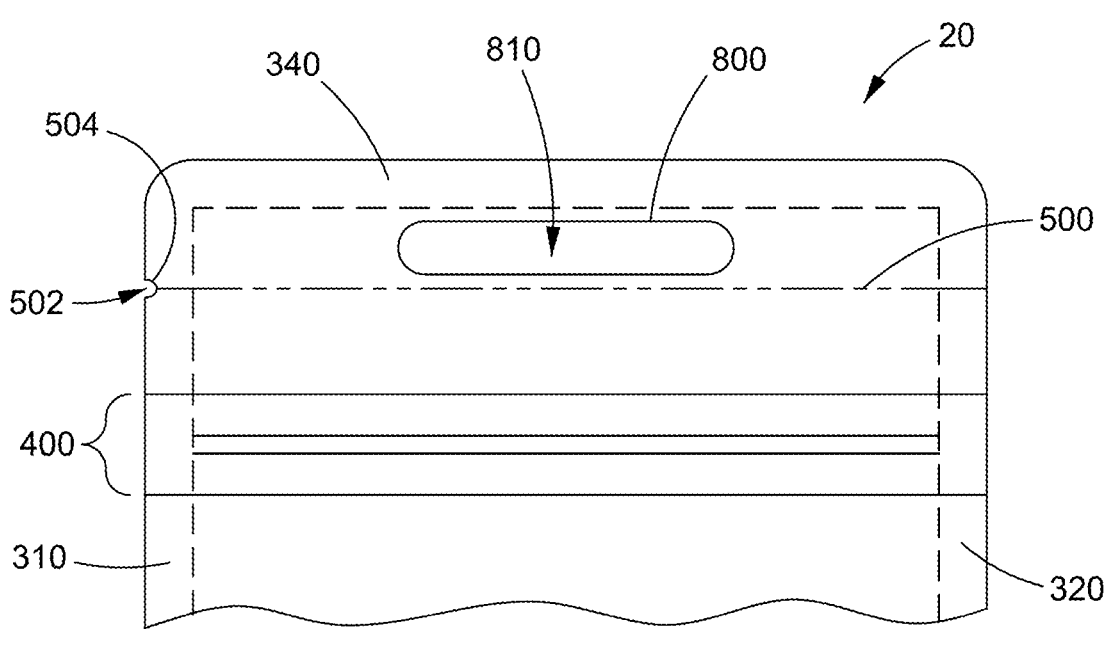
FIG. 8a illustrates a schematic front view of a top portion of an embodiment of a quad-seal bag.
Figure 8B:
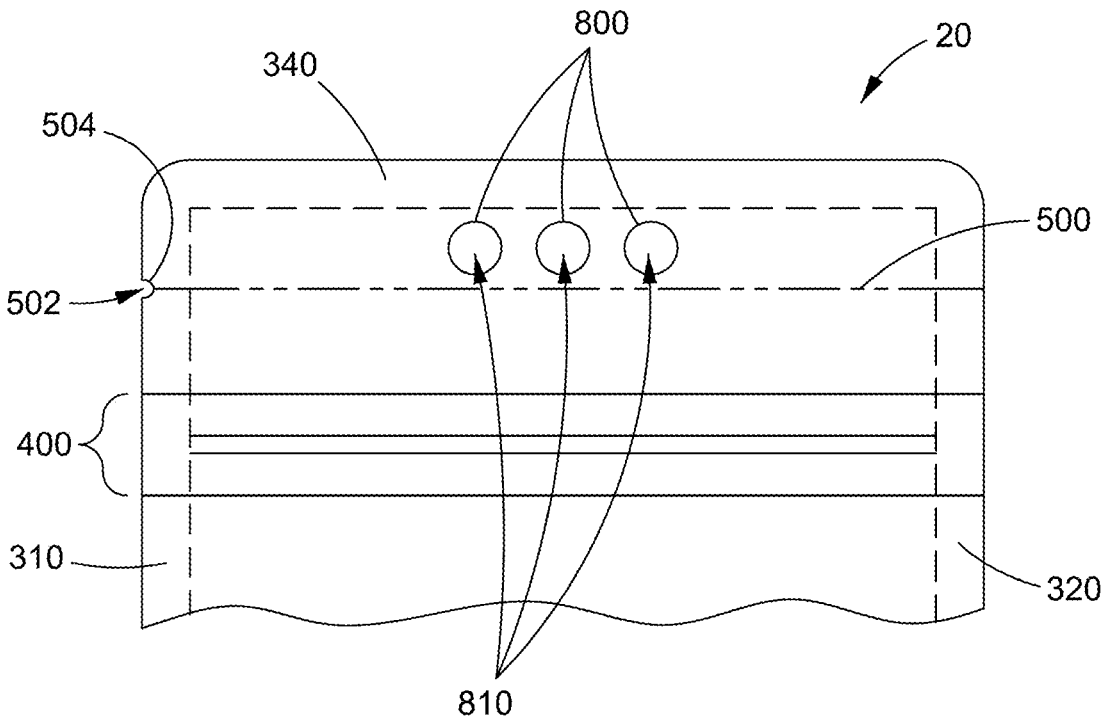
FIG. 8b illustrates a schematic front view of a top portion of an embodiment of a quad-seal bag.

The quad-seal bags may further include a handle or finger holes that are advantageous when carrying, lifting or handling the bag. With reference to FIGS. 8a and 8b, schematic views of the top portion of an embodiment of a sealed quad-seal bag 20, are shown. FIG. 8a shows a handle perimeter 800 that may be formed by handle forming lines of weakness or cut that correspond in each of the front panel

210 and the back panel 220 (not shown). The handle 810 is formed when the handle forming lines of weakness are broken or the cut is made such that portions of the front panel 210 and back panel 220 can be removed thus forming a handle 810 (e.g., hole).

In another embodiment, the handle forming lines of weakness or cut may form an unenclosed shape that does not form a closed perimeter. In this embodiment, the handle openings may alternatively be formed by breaking the handle forming lines of weakness or cut such that portions of the front panel and the back panel are folded away from the handle perimeter to form the handle.

The handle forming lines of weakness or cut may be formed by perforations, score lines, laser cuts, die cuts, or any other cutting or scoring method that is known in the art. In another embodiment, the bag 20 may have multiple handles, for example to form openings for individual fingers as shown in FIG. 8b.

Areas of the front panel and the second panel outside of the handle perimeter may be connected to each other with adhesive, ultrasonic seals, heat seals, pressure seals or any other seal known in the art to provide, for example, sealing to enclose the product contents, ease of handling and/or neater appearance.

The handles may be located in any area of the bag. Handles are usually placed symmetrically between the first side seal and the second side seal and are positioned between the top seal and the bottom seal. Further, if the bag includes an opening feature, the handles may be placed between the top seal and the opening feature.

In some embodiments, the quad-seal bags may include a ventilation feature that is advantageous for the handling of the bags, especially bags that include large product weights. For example, the ventilation feature allows for air movement from the bag inner space to the environment that is exterior to the bag that facilitates bag handling without risk of the bag splitting open, either in the film panels or at the seals. The ventilation feature can also aid an end user with closing the bag by allowing excess air to be removed from the package. The ventilation feature may include, for example, perforations, micro-perforations, slits, and small holes in the panels, or tortuous paths formed in the seals. The ventilation feature is fabricated into the bag such that pest infestation or product exiting the bag is avoided; that is, the ventilation feature can be sized accordingly for the product contained in the bag. The ventilation feature may be located in any of the front panel, the back panel, the first side panel, the second side panel, or the bottom panel (if included), or combinations thereof, and/or in any of the seals. In some embodiments, the ventilation feature may be included in the first side panel, the second side panel or a combination of the first side panel and the second side panel. With reference to FIG. 5, a ventilation feature 900 is shown in the first side panel 230 and the second side panel 240 as a plurality of micro-perforations.

The quad-seal bags described herein demonstrate improved drop strength. Quad-seal bags may contain a variety of dry products that are packaged in the bag that can include relatively large product weights, for example, about 1.4 kg to about 22.7 kg (e.g., about 3 pounds to about 50 pounds). The quad-seal bags can experience mishandling throughout the supply chain, for example, being dropped or thrown about, as well as falling from a shelf, such as in a retail setting. The effects of bag drops include product leakage or spillage due to seal failure or blowout, film splitting, film tearing, film delamination, or film rupture caused by the momentum of the mass of product contained therein when the bag contacts the surface it is dropped upon. Drop testing according to ASTM D 5276-98 test procedure A2.2.1 can be used to characterize the drop performance of quad-seal bags. The quad-seal bags of the present disclosure demonstrate improved or comparable drop test pass rates when compared to bags that do not include the recyclable packaging film described herein. A passing drop test result represents that the quad-seal bag resisted rupture at a drop height of 91.4 cm (36 inches) on the bottom panel. The term "rupture", as used herein, refers to an opening size (e.g., film hole, film tear, film split, seal blowout, seal opening) that allows the product to exit the quad-seal bag freely and allows the entrance of insects and pests.

The quad-seal bags described herein have the distinct advantage of recyclability in a polyethylene or polyolefin recycling stream. This advantage is achieved while maintaining excellent durability and excellent drop strength.

As described herein, the "total composition" of the bag refers to all components, including the panels, zipper and any other additional components. The total composition may include between 90% and 99% polyethylene-based materials, by weight. In some embodiments, the total composition of the bag is greater than 90%, or greater than 95% polyethylene-based materials, by weight.

Recyclable Packaging Film

The quad-seal bags described herein have panels formed from a recyclable packaging film. As used herein, the term "recyclable" refers to treatment of or processes applied to used materials to make the materials suitable for reuse. In some instances, recyclable is intended to reflect that the material can be easily processed in a recycling process that accepts "all-polyethylene" articles or "all-polyolefin" articles. In other instances, recyclable is intended to reflect that the material meets recycled content standards established by organizations (e.g., The Association of Plastic Recycling or Recycled Material Standard). Typically, these recycling processes can accept low levels of some contaminant material. As such, recyclable further reflects the packaging film having very high levels of polyethylene and low levels of acceptable contaminates. The total composition defined by weight of materials defines the recyclability of the packaging film. As described herein, the "total composition" of the recyclable packaging film refers to all materials encompassed therein. The total composition of the packaging film may include between 90% and 99% polyethylene-based materials, by weight. In some embodiments, the total composition of the recyclable packaging film is greater than 90%, or greater than 95% polyethylene-based materials, by weight.

As used herein, the term "polyethylene-based" refers to an article (i.e., a bag, a film, a layer, etc.) that comprises high levels of polyethylene-based polymers. In some cases, a polyethylene-based article has at least 50% polyethylene-based polymers, by weight. Or, a polyethylene-based article may have at least 60%, at least 70%, at least 80%, at least 90% or at least 95% polyethylene-based polymers, by weight. In some cases, a polyethylene-based article consists of polyethylene-based polymers.

As used herein, the term "polyethylene-based polymer" refers to a polymer that possesses ethylene linkages and maintains a glass transition temperature below 50° C. The polymer may be a homopolymer of ethylene or a copolymer of ethylene and other monomers. Examples of polyethylene-based polymers include but are not limited to low-density polyethylene (LDPE), high-density polyethylene (HDPE), linear low-density polyethylene (LLPDE), metallocene-catalyzed linear-low density polyethylene (mLLDPE), ethylene-vinyl acetate copolymer (EVA), cyclic olefin copolymers (COC), and maleic anhydride grafted polyethylene (MAH-PE). As used herein, "polyethylene-based" does not encompass ethylene vinyl alcohol copolymers (i.e., EVOH, saponified or hydrolyzed ethylene vinyl acetate copolymer or vinyl alcohol copolymer having an ethylene comonomer), as this material is accounted for separately.

The term "polyethylene-rich", as used herein, refers to an article (i.e., a bag, a film, a layer, etc.) that comprises very high levels of polyethylene-based polymers. In some cases, a polyethylene-rich article has at least 90% polyethylene-based polymers, by weight. Or, a polyethylene-rich article may have at least 92%, at least 94%, at least 96%, at least 98% or 100% polyethylene-based polymers, by weight. In some cases, a polyethylene-rich article consists of polyethylene-based polymers.

The recyclable packaging film used for the panels of the quad-seal bag may contain EVOH to increase gas barrier properties if desired for the particular package application. EVOH is not considered to be a polyethylene-based polymer as described herein, as it can cause issues in a polyethylene or polyolefin recycling stream. The total composition of the recyclable film may include between 0% and 5% ethylene vinyl alcohol copolymer, by weight.

As used herein, a "layer" is a homogeneous building block of films. Layers may be continuous or discontinuous (i.e., patterned) with the length and width of the film. As used herein, the term "film" is a mono-layer or multi-layer web that has an insignificant z-direction dimension (thickness) as compared to the x- and y-direction dimensions (length and width), not unlike a piece of paper. Films are generally regarded as having two major surfaces, opposite each other, expanding in the length and width directions. Films may be built from an unlimited number of films and/or layers, the films and/or layers being bonded together to form a composite article, such as a panel.

As used herein, the term "exterior" is used to describe a film, layer or surface that is located in a position such that it is at or near the surrounding environment when the film is used in a packaging application. As used herein, the term "interior" is used to describe a film, layer or surface that is located in a position such that it is at or near the packaged product when the film is used in a packaging application. As used herein, the term "inner" is used to describe a film or layer that is not located on the surface of the film in which it is comprised. An inner layer of a film is adjacent to another layer of the same film on both sides. In other words, the layers of a film that are at the surface of that film are not inner layers.

Figure 9:
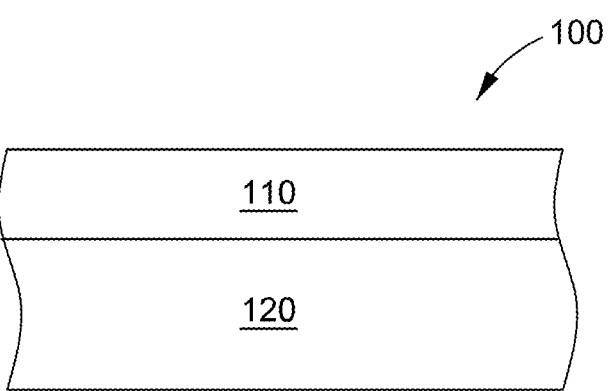
FIG. 9 illustrates a schematic cross-section view of an embodiment of a recyclable packaging film.

An embodiment of the recyclable packaging film is shown in FIG. 9. Here, the recyclable packaging film 100 has a machine-direction oriented polyethylene-rich exterior film 110. When used to form a quad-seal bag, the exterior film 110 is located so that it is in contact with the environment surrounding the package. The recyclable packaging film 100 has a polyethylene-based interior film 120. When used to form a quad-seal bag, the interior film 120 is located so that it is in contact with the interior space of the package and/or the product within the package. The exterior film 110 and the interior film 120 are connected to each other by any means known to those skilled in the art of packaging film converting.

Figure 10:
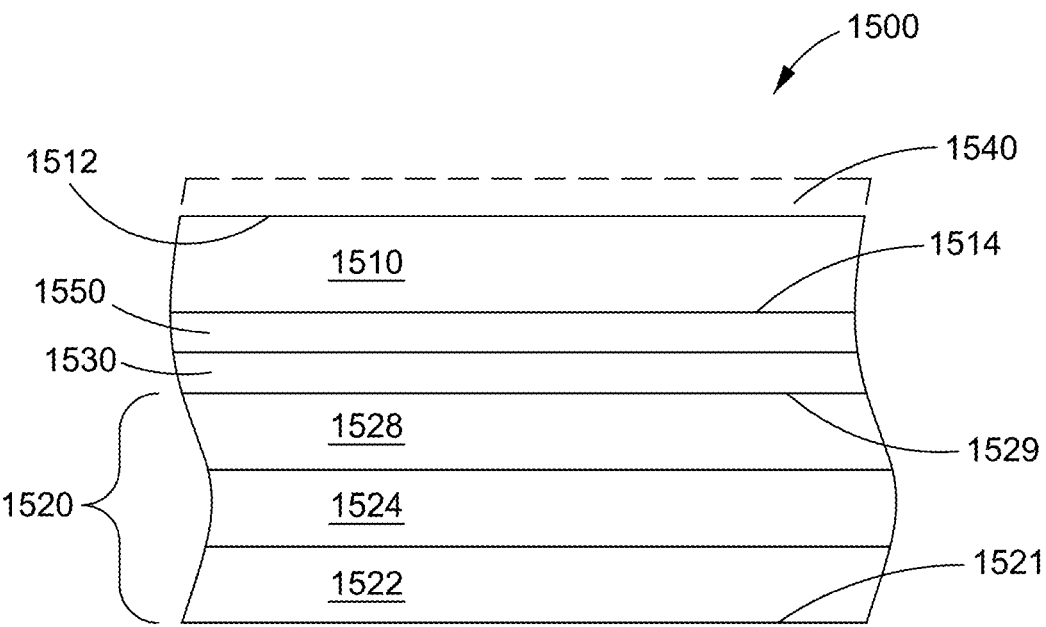
FIG. 10 illustrates a schematic cross-sectional view of an embodiment of a recyclable packaging film.

Another embodiment of the recyclable packaging film is shown in FIG. 10. A recyclable packaging film 1500 includes an exterior layer 1510 that includes a laminating surface 1514 and an exposed surface 1512 that includes a heat resistant overprint varnish 1540. An ink layer 1550 that includes printed graphics is disposed on the laminating surface 1514 of the exterior film 1510. An interior film 1520 includes a first outer layer 1522, a second outer layer 1528 and a first inner layer 1524. The first outer layer 1522 includes a sealing surface 1521. The second outer layer 1528 includes a laminating surface 1529. The exterior film 1510 and the interior film 1520 connected to each other by an adhesive layer 1530 where the ink layer 1550 is disposed between the laminating surface 1514 of the exterior film 1510 and the adhesive layer 1530. In some embodiments, the first inner layer includes a white pigment.

Optionally, the exposed surface of the exterior film is covered by a heat-resistant over-print varnish or lacquer. The over-print varnish may cover the entire exposed surface of the exterior film or it may be patterned. Preferably, this layer of varnish is clear and very thin, adding almost no additional stiffness to the overall structure. In some instances, the over-print varnish or lacquer may include a matte finish (e.g., dull, flat, low or no gloss, low or no shine) to the exposed surface of the exterior film.

Additionally, the exterior film may be printed on either one or both surfaces (i.e., the laminating surface or the exposed surface), providing graphics to the overall film and bag. In an embodiment, the exterior film is printed on the laminating surface such that the printed graphics are between the exterior film and the adhesive layer.

Figure 11:
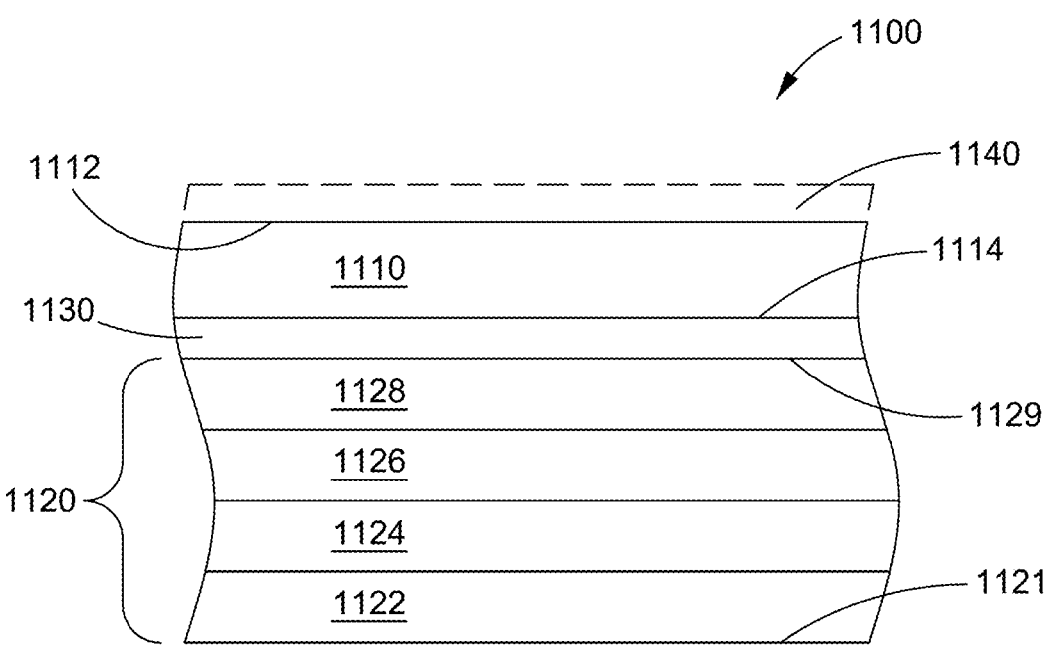
FIG. 11 illustrates a schematic cross-section view of an embodiment of a recyclable packaging film.

In another embodiment of the recyclable packaging film, shown in FIG. 11, the packaging film 1100 has an exterior film 1110 and an interior film 1120, connected to each other by an adhesive layer 1130. The exterior film has an exposed surface 1112 and a laminating surface 1114. The interior film has a first outer layer 1122 having a sealing surface 1121, a second outer layer 1128 having a laminating surface 1129. The interior film has a first inner layer 1124 and a second inner layer 1126. The second inner layer 1126 is in a relatively exterior position when compared to the first inner layer 1124. In other words, the second inner layer 1126 is between the first inner layer 1124 of the interior film 1120 and the exterior film 1110. In some embodiments, the first inner layer 1124 contains a white pigment and the second inner layer 1126 contains EVOH. The recyclable packaging film 1100 may also include a heat resistant overprint varnish 1140 located on the exposed surface 1112 of the exterior film 1110. In various embodiments, the interior film may include several inner layers, one inner layer or no inner layer.

The recyclable packaging film may have an oxygen transmission rate, when an oxygen barrier material such as EVOH is included in the recyclable packaging film composition, of less than 1.0 $cm^3/m^2$ day, or between 0.1 $cm^3/m^2$ day and 1.5 $cm^3/m^2$ day, or between 0.5 $cm^3/m^2$ day and 1.0 $cm^3/m^2$ day, when measured at 23° C. and 50% relative humidity using ASTM F1927. The recyclable packaging film may have an oxygen transmission rate of less than 2.0 $cm^3/m^2$ day, or between 0.5 $cm^3/m^2$ day and 5.0 $cm^3/m^2$ day, or between 1.0 $cm^3/m^2$ day and 2.0 $cm^3/m^2$ day, when measured at 23° C. and 70% relative humidity using ASTM F1927. The recyclable packaging film may have a moisture transmission rate of less than 1.0 $g/m^2$ day, or between 0.1 $g/m^2$ day and 1.0 $g/m^2$ day, or between 0.3 $g/m^2$ day and 1.0 $g/m^2$ day when measured at 23° C. using ASTM F1249. Without an oxygen barrier material such as EVOH, the recyclable packaging film may include an oxygen transmission rate from 200 $cm^3/m^2$ day –900 $cm^3/m^2$ day. The recyclable packaging film may have a moisture transmission rate of less than 5.0 $g/m^2$ day, or between 1.0 $g/m^2$ day and 5.0 $g/m^2$ day, or between 1.5 $g/m^2$ day and 4.0 $g/m^2$ day when measured at 38° C. using ASTM F1249.

The exterior film of the recyclable packaging film is polyethylene-rich. The exterior film may consist of one or more polyethylene-based polymers. The exterior film may consist of very high levels of polyethylene-based polymers, containing only small amounts of processing additives that are not polyethylene-based (i.e., antiblock, slip, etc.). The total composition of the exterior film may include between 90% and 100% polyethylene-based materials, by weight. In some embodiments, the total composition of the exterior film is greater than 90%, or greater than 95% polyethylene-based materials, by weight.

The exterior film may be mono-layer or multi-layer and may be produced by any known film converting method.

The exterior film of the recyclable packaging film can be machine-direction oriented. Even though the exterior film is oriented, it is beneficial for the film to have a machine-direction free shrink of less than 5%, or preferably less than 3%, after heating an unrestrained sample of the film in an oven at 100° C. for 15 minutes. Higher shrink materials have a detrimental effect when used in pouch making as the shrinking film in the heat seal areas creates higher variation in print repeat and machinability. When the exterior film of the recyclable packaging film has low shrink under heating conditions, there is significantly less distortion of the seals and graphics.

As used herein, the terms "machine-direction oriented" and "MDO", indicate that the film has been heated to a temperature lower than the melting point of the material and stretched at least 2× in the machine-direction. This is typically accomplished by an MDO process using heated rolls. A typical blown film process does impart some stretching of the film, but not enough to be considered oriented as described herein. An oriented film may also be heat set (i.e., annealed) after orientation, such that it is dimensionally stable under elevated temperature conditions that might be experienced during conversion of the film (i.e., printing or laminating) or during the use of the packaging film (i.e., heat sealing). A film may be produced using specific polymers and may be oriented using specific conditions which optimize the heat resistance of the film.

The exterior film of the recyclable packaging film may have a thickness from 10 microns to 100 microns, preferably from 20 microns to 50 microns. The exterior film may have an average density of less than 0.97 $g/cm^3$ and that is greater than 0.88 $g/cm^3$.

The exterior film may have a transverse direction elongation at break greater than 500% when tested according to ASTM D882. Having an elongation at break at this level leads to a tougher overall pouch, able to survive severe impact, such as drop testing.

The interior film of the recyclable packaging film is polyethylene-based. The interior film is multi-layer and may contain one or more polyethylene-based polymers. The total composition of the interior film may include between 50% and 100% polyethylene-based materials, by weight. In some embodiments, the total composition of the interior film is greater than 90%, or greater than 95% polyethylene-based materials, by weight. The total composition of the interior film may include between 0% and 10% EVOH, by weight. In some embodiments, the total composition of the interior film is less than 5%, or less than 4% EVOH, by weight.

As discussed, the interior film may have a first outer layer which creates the sealing surface. This layer is arranged closest to the inside of the package when the recyclable packaging film is formed into a quad-seal bag. The first outer layer contains polyethylene-based polymers that can achieve low heat seal initiation temperatures for easy sealing and caulking of the bag triple points. The term "seal strength", as used herein, refers to the strength of a heat seal at ambient temperature after the seal has been formed. Recyclable packaging films described by this disclosure include a first outer layer composition that provides a seal strength within a range from about 3,500 gm/25.4 mm (7.7 pounds/inch) to about 7,500 gm/25.4 mm (16.5 pounds/inch) or even greater than 7,500 gm/25.4, when the film is sealed to itself at a temperature within a range from 77° C. to 138° C. (170° F. to 280° F.) under 30 psi and a dwell time of one second.

The term "seal initiation temperature", as used herein, refers to the first temperature above ambient at which a seal can form by applying a given temperature and pressure to a given thickness of packaging film for a given length of time. For example, the first outer layer may include a seal initiation temperature that is less than 82° C. (180° F.), 99° C. (210° F.), 115° C. (240° F.), or less than 138° C. (280° F.).

Further, the first outer layer containing polyethylene-based polymers includes a hot tack strength. Heat seals are strongest after they have cooled to ambient temperature. However, to operate at a commercially relevant pace, packages may be formed and handled before the heat seals have had time to completely cool. At this point, the heat seals have not completely solidified (or recrystallized), which generally reduces the maximum seal strength. The term "hot tack", as used herein, refers to the seal strength of a heat seal immediately after the sealing operation and before it has cooled down and reached its maximum seal strength. While it is important that the films exhibit sufficient hot tack to maintain seal integrity, it is also essential that the films do not stick to themselves or the packaging equipment during the package forming process. In some embodiments, the recyclable packaging films hot tack should be greater than 1 lb/in at or below 110° C. (230° F.) when tested according to ASTM F88 under 30 psi, a one second dwell time and a 0.2 second cooling time.

Additionally, the sealing surface of the interior film should have a minimum static coefficient of friction (COF) of 0.45, sealant to sealant, as measured by ASTM 1894.

As discussed, the interior film may include an inner layer containing a white pigment. The white concentrate contributes to bag aesthetics and opacity level. The white concentrate may give the interior film a diffuse optical density between 0.30 and 0.50 units when measured using a transmission densitometer.

As discussed, the interior film may have a second outer layer that creates the laminating surface. In some embodiments, the laminating surface includes a polyethylene that includes a melting temperature of greater than 115° F. (240° F.).

As discussed, the interior film may have a first outer layer that creates the sealing surface. In some embodiments, the sealing surface includes a polyethylene that includes a melting temperature that is at least −6.67° C. (20° F.) lower than the laminating surface melting temperature.

In some embodiments, the interior film includes a laminating surface that includes a melting temperature of temperature of greater than 115° F. (240° F.) and a sealing surface that includes a melting temperature that is at least −6.67° C. (20° F.) lower than the laminating surface melting temperature.

The inventors have advantageously discovered that the melting temperature gradient between the laminating surface and the sealing surface as specified herein, permits the interior film to remain intact in the seal area when heat seals are formed. For example, the seals experience little to no flow-out of the molten interior film polymers while the seal is being formed. Accordingly, the quad-seal bag demonstrates improved drop test performance due to the interior film materials being completely or near completely present in the seals of the recyclable packaging film. Further, the drop test mode of failure of the quad-seal bag has been observed to be due to elongation and eventual tear of the interior film, as opposed to the failure of the seal itself, as observed with prior art packages. Failure due to elongation of the interior film is another indicator that the interior film remains intact in the seal.

The interior film includes a machine direction (MD) tear value and a cross direction (CD) tear value of greater than 17,000 mN (26.3 pound-force) according to ASTM D1922-09 as described herein. A high value of MD and CD tear may be indicative of the interior film having elasticity such that the most frequently observed drop test mode of failure is elongation to the point of tearing as opposed to failure of the seal.

The interior film may have a thickness from 25 microns to 200 microns, from 50 microns to 150 microns and more particularly from 114 microns to 140 microns. In some embodiments, the interior film thickness may be selected with consideration given to a product weight to be contained in the quad-seal bag. For some embodiments, the interior film thickness may by selected as indicated in TABLE 1 that shows interior film thickness for respective product weights.

TABLE 1

| Interior Film Thickness microns (mil) | Product Weight kg (pounds) |
|---|---|
| 104-120 | 1.1-2.8 |
| (4.1-4.7) | (2.5-8.5) |
| 120-132 | 2.8-7.7 |
| (4.7-5.2) | (8.5-17.0) |
| 132-145 | 7.7-21.3 |
| (5.2-5.7) | (17.0-47.0) |
| >145 | >21.3 |
| (>5.7) | (>47.0) |

The exterior film and the interior film may be laminated by heat, extrusion or adhesive. For example, the adhesive layer of the recyclable packaging film may include a one- or two-component laminating adhesive. These adhesives typically use polyurethane, acrylic, or epoxy amine type chemistry. In an embodiment, the adhesive layer may be a two-component polyurethane-based adhesive. Particular attention should be given to lamination aspects, including the selection of the laminating agent, as the recyclable packaging film requires a stiffness that provides good machinability. The terms "good machineability", "machine well", as used herein, refer to the recyclable packaging film having adequate stiffness to allow the recyclable packaging film to run at required machine speeds to form the quad-seal bag.

The recyclable packaging film may have a transverse direction elongation at break greater than 500% when tested according to ASTM D882. Having an elongation at break at this level leads to a tougher overall pouch, able to survive severe impact, such as drop testing.

The inventors have unexpectedly created a recyclable packaging film that includes the properties of good machinability and quad-seal package drop test survival. Variables such as those known by one of skill in the art to improve either machinability or drop test pass rates were found to be detrimental to the desired levels of each of these properties. For example, biaxially oriented exterior films are generally known by one of skill in the art to improve laminated film stiffness and overall film dimensional stability. However, biaxially oriented films used as the exterior film in the scope of this disclosure were found to fail drop testing in comparison to monoaxially oriented (i.e., machine direction oriented) exterior films disclosed herein. Additionally, one of skill in the art may expect a sealing layer that includes a low SIT to provide adequate seals and improved drop test pass rates. It was found that sealing layers within the scope of this disclosure, not only require low SIT, but also an appropriate hot tack in order to pass drop testing. In another example, a non-oriented film was used as the exterior film. The non-oriented film used as an exterior film passed drop tests but was found not to machine well on assets used to make quad seal format bags.

The recyclable packaging film demonstrates good thermal resistance. In some embodiments, the thermal resistance of the recyclable packaging film may be equal to or greater than about 138° C. In other words, recyclable packaging film may be thermally resistant to a temperature of at least about 138° C. In some embodiments, the thermal resistance of the recyclable packaging film may be equal to or greater than 140° C., equal to or greater than 150° C., equal to or greater than 160° C., equal to or greater than 170° C., equal to or greater than 180° C., equal to or greater than 190° C., or equal to or greater than 200° C.

Test Methods

Tear value: An Elmendorf tear method according to ASTM D1922-09 incorporating a Lorentzen and Wettre tearing tester, model 09ED (SE009ED, apparatus no. 989/221) was used. Test parameters included a 43 mm radius of tear, a precut in specimens and pendulum B.

Seal initiation temperature: The recyclable packaging films were heat sealed to itself (first outer layer to first outer layer) at different temperatures under 30 psi and a one second dwell time and allowed to cool to ambient temperature. The seal strengths or force required to delaminate the sealed films at a 90 degree angle was measured using an Instron Tensile Tester according to ASTM F88.

Hot tack seal: The recyclable packaging films were heat sealed to itself (first outer layer to first outer layer) at different temperatures under 30 psi, a one second dwell time and allowed to cool 0.2 second. The seal strengths or force required to delaminate the sealed films at a 90 degree angle was measured using an Instron Tensile Tester according to ASTM F88. The hot tack values at different temperatures were recorded.

Drop test: ASTM D 5276-98, test procedure A2.2.1:
  i. Drop heights: 50.8, 60.9, 76.2, 91.4, 106.7, 121.9, and 132.1 cm (20, 24, 30, 36, 42, 48, and 54 inches).
  ii. Number of pouches tested per height: varied and as specified in Tables 1 and 2.
  iii. Bottom drop: quad-seal bag was dropped from specified height such that the bottom of the bag was parallel to the landing surface upon drop.
  iv. Maximum drop height: highest at which 100% of sample size passes.
  v. Passing drop test result: 91.4 cm (36 inches) or greater.

Thermal resistance and sealant performance: The interior film of each of the examples and comparative examples interior films was sealed to itself by placing the packaging film within a sealing apparatus where an upper jaw (e.g., seal bar) was heated by metal exposure (i.e., bare metal, no non-stick coating) to a lower jaw (e.g., seal bar) that included a non-stick coating (e.g., TEFLON coating) and that was set at the reflected temperature. An initial seal test temperature was about 104° C. at a pressure of about 0.276 MPa and dwell time of 1 second. The temperature was increased in increments of about 5° C. to 6° C. (10° F.), while keeping the pressure and the dwell time constant. The film samples were visually inspected after each increment in temperature for film distortion and seal designation (i.e., Peel, OK) was determined when sample was removed from the sealing apparatus and hand evaluation of 2,500 g/25.4 mm force or less. Sample size was 2 for each temperature. Temperatures and seal performance were recorded at which seals formed.

Ventilation feature air flow rate: A Carleton Series 2000 Seal Strength Tester (Model F100-2600-3) and a Cole-Parmer Digital Flowmeter Model 32908-75 were used. Test parameters included flow=1, sensitivity=5, prefill=Y, units=inches $H_2O$, pressure=25, time=30, and control panel setting=standard creep test. An opening of an empty bag is secured around air nozzle such that air can only exit from the ventilation feature. Allow the pressure to reach a steady input pressure of 25+/−1 units of inches of $H_2O$. Maintain the pressure for 30 seconds and between 20 to 30 seconds, record air flow rate from the flowmeter in liters/minute (L/min).

EXAMPLES

A recyclable packaging film was produced by laminating an approximate 25 micron (0.96 g/cm³ density) machine-direction oriented polyethylene-based film (exterior film) to a polyethylene-based blown film (interior film), using a two-component polyurethane-based adhesive. The polyethylene exterior film had a machine direction secant modulus of about 1,600 N/mm², a transverse direction secant modulus of about 1,100 N/mm², and a transverse direction elongation at break of about 600% measured by ASTM D 882. The exterior film had a free shrink of approximately 2.5% in the machine direction when stored unrestrained in an oven at 100° C. for 15 minutes. The polyethylene-based interior film had a structure of lamination layer (i.e., second outer layer)/white pigment layer (i.e. second inner layer)/sealing layer (i.e. first outer layer). The laminating surface of the interior film includes a polyethylene that includes a melting temperature greater than 115.5° C. and the sealing layer of the interior film includes a polyethylene that includes a melting temperature that is at least −6.67° C. (20° F.) lower than the laminating surface melting temperature.

Comparative example films were produced by laminating an exterior film, as specified below, to an interior film using a two-component polyurethane-based adhesive. The interior film had a structure of lamination layer (i.e., second outer layer)/white pigment layer (i.e., second inner layer)/sealing layer (i.e., first outer layer). The interior film is specified below and was either, i) a polyethylene-based blown film or ii) a polyethylene-based blown film that included a laminating surface that includes a melting temperature greater than 115.5° C. and a sealing layer that includes a melting temperature that is at least −6.67° C. (20° F.) lower than the laminating surface melting temperature.

The recyclable packaging film and the comparative example film were formed into quad-seal bags having a front panel, a back panel, a first side panel, a second side panel and a bottom panel, as described herein. The bag was filled with varying weights of dog food and sealed closed, without any leaks at any of the triple points. The bags included in TABLE 2 included a ventilation feature that enables an air flow rate of a minimum of 3 L/min.

The bag was dropped from varying heights and the Maximum Drop Height was recorded at which all the bags passed the drop test, that is, without bag rupture.

For each trial:

MDO PE=machine-direction oriented polyethylene film

BOPE=biaxially oriented polyethylene film

Blown PE=non-oriented polyethylene film

TABLE 2

Trial 1: Product Weight = 2.7 kg (6 pounds); Sample size = n

| Sample (n = sample size) | Exterior Film (microns, film type) | Interior Film (microns, film type) | Maximum Drop Height (cm) | Comments (% pass) |
|---|---|---|---|---|
| Comparative Example 1 n = 10 | 25.4 MDO PE | 88.9 i) | 50.8 | Failed drop test (0%) |
| Comparative Example 2 n = 10 | 24.4 BOPE | 101.6 i) | 50.8 | Failed drop test (0%) |
| Comparative Example 3 n = 18 | 24.4 BOPE | 114.3 ii) | 76.2 | Failed drop test (100%) |
| Comparative Example 4 n = 10 | 31.75 Blown PE (no orientation) | 114.3 ii) | 106.7 | Passed drop test, does not machine well (100%) |
| Example 1 n = 10 | 25.4 MDO PE | 114.3 ii) | 106.7 | Passed drop test (100%) |
| Example 2 n = 10 | 25.4 MDO PE | 114.3 ii) | 106.7 | Passed drop test (100%) |

TABLE 3

Trial 2: Product Weight = as specified

| Sample (n = sample size) | Exterior Film (microns, film type) | Interior Film (microns, film type) | Maximum Drop Height (cm) | Product Weight (kg) | Comments (% pass) |
|---|---|---|---|---|---|
| Comparative Example 1 n = 20 | 25.4 BOPE | 127 i) | 50.8 | 5.4 | Failed drop test (100%) |
| Comparative Example 2 n = 5 | 25.4 BOPE | 139.7 i) | 76.2 | 5.5 | Failed drop test (0%) |
| Example 1 n = 20 | 25.4 MDO PE | 139.7 ii) | 91.4 | 10.9 | Passed drop test (100%) |
| Example 2 n = 16 | 22.9 MDO PE | 114.3 ii) | 106.7 | 2.7 | Passed drop test (100%) |
| Example 3 n = 40 | 25.4 MDO PE | 139.7 ii) | 91.4 | 10.9 | Passed drop test (100%) |

Table 4 shows thermal resistance and seal performance of Comparative Examples 1-4 and Example 1 of the films according to Table 2. Table 5 shows thermal resistance and seal performance of Comparative Example 2 and Example 1 of the films according to Table 3. Tables 4 and 5 include five stages of the Comparative Example and Example films undergoing thermal resistance measurement. The five stages were visually observed at various temperatures during thermal resistance measurement. The five stages were, a. No/negligible distortion b. Slight distortion c. Medium distortion d. High distortion e. Destruction Further, the interior film sealing performance was rated according to the following two categories:

Peel: material initially tacked but failed by peeling apart

OK: seal held together

TABLE 4

| | Sample (n = 2) | | | | | | | | | | | | |
|---|---|---|---|---|---|---|---|---|---|---|---|---|---|
| | 116 (° C.) | 121 (° C.) | 127 (° C.) | 132 (° C.) | 138 (° C.) | 143 (° C.) | 149 (° C.) | 154 (° C.) | 160 (° C.) | 166 (° C.) | 171 (° C.) | 177 (° C.) | 182 (° C.) |
| Comparative Example 1 | a. Peel | a. Peel | b. OK | b. OK | c. OK | c. OK | e. OK | e. OK | | | | | |
| Comparative Example 2 | a. OK | a. OK | a. OK | b. OK | c. OK | c. OK | d. OK | e. OK | e. OK | e. OK | e. OK | | |
| Comparative Example 3 | a. OK | a. OK | a. OK | b. OK | c. OK | c. OK | d. OK | d. OK | e. OK | e. OK | e. OK | | |
| Comparative Example 4 | a. OK | a. OK | b. OK | b. OK | c. OK | c. OK | e. OK | e. OK | | | | | |
| Example 1 | a. OK | a. OK | a. OK | a. OK | b. OK | d. OK | d. OK | e. OK | | | | | |

As shown in Table 4, Example 1 showed no/negligible distortion up to about 132° C., a slight distortion from about 132° C. to about 138° C., a high distortion from about 138° C. to about 149° C., and destruction after about 149° C. Example 1 formed seals that remained sealed at all temperatures (i.e., OK). Comparative Example 1 showed no/negligible distortion up to about 121° C., a slight distortion from about 121° C. to about 132° C., a medium distortion from about 132° C. to about 149° C., and destruction after about 149° C. Comparative Example 1 seals did not stay sealed from 116° C. to about 127° C.; seals remained intact above about 127° C. Comparative Example 2 showed no/negligible distortion up to about 132° C., a slight distortion from about 132° C. to about 138° C., a medium distortion from about 138° C. to about 149° C., high distortion from about 149° C. to about 154° C., and destruction after about 154° C. Comparative Example 2 formed seals that remained sealed at all temperatures. Comparative Example 3 showed no/negligible distortion up to about 132° C., a slight distortion from about 132° C. to about 138° C., a medium distortion from about 138° C. to about 149° C., high distortion from about 149° C. to about 160° C., and destruction after about 160° C. Comparative Example 3 formed seals that remained sealed at all temperatures. Comparative Example 4 showed no/negligible distortion up to about 127° C., a slight distortion from about 127° C. to about 138° C., a medium distortion from about 138° C. to about 149° C., high distortion from about 149° C. to about 154° C., and destruction after about 154° C. Comparative Example 4 formed seals that remained sealed at all temperatures. Example 1 demonstrated minimal film distortion at temperatures of up to about 143° C. when compared to Comparative Examples 1-4 that demonstrated minimal film distortion at temperatures from 116° C. to about 138° C. Example 1 demonstrated better seal performance (i.e., OK) at the same temperatures, about 116° C. to about 121° C., than Comparative Example 1 (i.e., Peel). Example 1 overall demonstrates a wider sealing window from about 116° C. to about 143° C. based on film distortion and seals remaining sealed than a sealing window of Comparative Examples 1-4 that is from about 116° C. to about 138° C. Note that no seals formed below 116° C.

strated minimal film distortion at temperatures of up to about 143° C. when compared to Comparative Examples 1-4 that demonstrated minimal film distortion at temperatures from about 116° C. to about 149° C. Example 1 demonstrated better seal performance (i.e., OK) at the same temperatures, about 116° C. to about 138° C., than Comparative Example 1 (i.e., Peel). Example 1 overall demonstrates a wider sealing window from about 116° C. to about 149° C. based on film distortion and seals remaining sealed than a sealing window of Comparative Example 2 that is about 138° C. to about 143° C.

What is claimed is:

1. A packaged product comprising:
a granular product; and
a bag comprising a front panel, a back panel, a first side panel, a second side panel, a top seal, a first side seal, a second side seal and a bottom seal;
wherein the first side seal comprises a front leg portion bonding the front panel to the first side panel, and a back leg portion bonding the back panel to the first side panel;
wherein the second side seal comprises a front leg portion bonding the front panel to the second side panel, and a back leg portion bonding the back panel to the second side panel;
wherein each of the front panel, the back panel, the first side panel, and the second side panel comprises a recyclable packaging film comprising a polyethylene-rich, oriented exterior film, a polyethylene-based interior film and an adhesive layer connecting the exterior film to the interior film;
wherein the interior film comprises a sealing surface comprising a first outer layer of the interior film that can be exposed to the granular product;
wherein the interior film comprises a laminating surface comprising a second outer layer of the interior film that is exposed to the adhesive layer;
wherein the bag contains the granular product;
wherein the bag comprises a top and a bottom; and

TABLE 5

| | Sample (n = 2) | | | | | | | | | | | | |
|---|---|---|---|---|---|---|---|---|---|---|---|---|---|
| | 116 (° C.) | 121 (° C.) | 127 (° C.) | 132 (° C.) | 138 (° C.) | 143 (° C.) | 149 (° C.) | 154 (° C.) | 160 (° C.) | 166 (° C.) | 171 (° C.) | 177 (° C.) | 182 (° C.) |
| Comparative Example 2 | | | a. Peel | a. Peel | b. OK | c. OK | c. OK | d. OK | d. OK | e. OK | e. OK | e. OK | |
| Example 1 | a. OK | a. OK | a. OK | a. OK | b. OK | b. OK | c. OK | c. OK | d. OK | d. OK | d. OK | d. OK | d. OK |

As shown in Table 5, Example 1 showed no/negligible distortion up to about 138° C., a slight distortion from about 138° C. to about 149° C., a medium distortion from about 149° C. to about 160° C., and high distortion after about 160° C. Example 1 formed seals that remained sealed at all temperatures (i.e., OK). Comparative Example 2 showed no/negligible distortion up to about 138° C., a slight distortion from about 138° C. to about 143° C., a medium distortion from about 143° C. to about 154° C., a high distortion from about 154° C. to about 166° C., and destruction after about 166° C. Comparative Example 2 seals did not stay sealed from about 127° C. to about 138° C.; seals remained intact above about 138° C. Example 1 demonwherein the packaged product resists rupture when dropped according to ASTM D5276-98 test procedure A2.2.1 on the bottom of the bag at a drop height of 91.44 cm (36 inches).

2. The packaged product according to claim 1, wherein the laminating surface of the interior film comprises a polyethylene comprising a melting temperature greater than 115.5° C. (240° F.).

3. The packaged product according to claim 1, wherein the first side seal further comprises a top portion bonding the front panel to the back panel and the second side seal further comprises a top portion bonding the front panel to the back panel.

4. The packaged product according to claim 1, wherein the bag further comprises a bottom panel constructed of a recyclable packaging film, wherein the bottom seal comprises a front portion bonding the front panel to the bottom panel, a back portion bonding the back panel to the bottom panel, a first side portion bonding the first side panel to the bottom panel, and a second side portion bonding the second side panel to the bottom panel.

5. The packaged product according to claim 1, wherein the bottom seal bonds the front panel to the back panel.

6. The packaged product according to claim 1, wherein at least one of the front panel, the back panel, the first side panel and the second side panel comprises a ventilation feature.

7. The packaged product according to claim 1, further comprising a zipper closure.

8. The packaged product according to claim 1, wherein the granular product comprises a weight from 1.36 kg to 22.68 kg (3 pounds to 50 pounds).

9. The packaged product according to claim 1, wherein the bag comprises an interior film thickness from 104 microns to 145 microns (4.1 mil to 5.7 mil).

10. The packaged product according to claim 1, wherein the exterior film is machine-direction oriented and comprises at least 95% polyethylene-based materials.

11. The packaged product according to claim 1, wherein the exterior film is machine-direction oriented and consists of one or more polyethylene-based polymers.

12. The packaged product according to claim 1, wherein the sealing surface of the interior film comprises a polyethylene comprising a melting temperature that is at least −6.67° C. (20° F.) lower than the laminating surface melting temperature.

13. The packaged product according to claim 1, wherein the adhesive layer is a two-component laminating adhesive.

14. The packaged product according to claim 1, wherein the bag comprises a total composition comprising between 90% and 99% polyethylene-based polymer, by weight.

15. The packaged product according to claim 1, wherein the bag comprises a total composition comprising at least 95% polyethylene-based polymer, by weight.

16. The packaged product according to claim 1, wherein the recyclable packaging film comprises a machine direction tear value and a cross direction tear value, each comprising greater than 17,000 mN (26.3 pound-force) according to ASTM D1922-09 as described herein.

17. The packaged product according to claim 1, wherein the recyclable packaging film comprises a print layer positioned between the exterior film and the interior film.

18. The packaged product according to claim 1, wherein the recyclable packaging film comprises a matte varnish on an exterior surface of the exterior film.

19. The packaged product according to claim 1, wherein the recyclable packaging film comprises a seal window comprising from 116° C. to about 149° C.

* * * * *